(12) United States Patent
El Dokor et al.

(10) Patent No.: US 12,229,995 B1
(45) Date of Patent: Feb. 18, 2025

(54) FINE CALIBRATION PARAMETER VALIDATION

(71) Applicant: Edge 3 Technologies, Inc., Phoenix, AZ (US)

(72) Inventors: Tarek El Dokor, Phoenix, AZ (US); Jordan Cluster, Tempe, AZ (US); Milind Subhash Gide, Phoenix, AZ (US)

(73) Assignee: Edge 3 Technologies, Phoenix, AZ (US)

( * ) Notice: Subject to any disclaimer, the term of this patent is extended or adjusted under 35 U.S.C. 154(b) by 0 days.

(21) Appl. No.: 17/473,647

(22) Filed: Sep. 13, 2021

Related U.S. Application Data

(63) Continuation of application No. 16/833,647, filed on Mar. 29, 2020, now Pat. No. 11,120,576, which is a continuation of application No. 16/177,360, filed on Oct. 31, 2018, now Pat. No. 10,607,370.

(60) Provisional application No. 62/579,851, filed on Oct. 31, 2017.

(51) Int. Cl.
*G06T 7/80* (2017.01)
*H04N 17/00* (2006.01)

(52) U.S. Cl.
CPC .............. *G06T 7/80* (2017.01); *H04N 17/002* (2013.01)

(58) Field of Classification Search
CPC .............................. G06T 7/80; H04N 17/002
See application file for complete search history.

(56) References Cited

U.S. PATENT DOCUMENTS

| | | | | |
|---|---|---|---|---|
| 5,818,977 A | * | 10/1998 | Tansley | H04N 5/235 |
| | | | | 382/284 |
| 2012/0307089 A1 | * | 12/2012 | Rukes | H04N 5/2328 |
| | | | | 348/208.99 |
| 2014/0247279 A1 | * | 9/2014 | Nicholas | G06F 3/011 |
| | | | | 345/633 |
| 2017/0094255 A1 | * | 3/2017 | Zabatani | G06T 7/85 |
| 2017/0098305 A1 | * | 4/2017 | Gossow | G06T 7/80 |

* cited by examiner

*Primary Examiner* — Michael E Teitelbaum
(74) *Attorney, Agent, or Firm* — Gordon Kessler

(57) ABSTRACT

A method and system for calibration parameter validation. The method includes performing a camera calibration generating a calibration result, applying a coarse pass-fail criteria to the calibration result and rejecting the camera if the calibration result does not pass the coarse pass fail-criteria. The method further includes applying a fine pass-fail criteria based upon at least information stored at a central repository to the calibration result if the calibration result passes the coarse pass-fail criteria, rejecting the camera if the calibration result does not pass the fine pass fail-criteria, accepting the camera if the calibration result passes the fine pass fail-criteria, and entering the calibration result into the central repository. The information stored at the central repository includes key performance indicator/key performance metric information for one or more measured parameters of the calibration result.

14 Claims, 8 Drawing Sheets

FINE CALIBRATION PARAMETER VALIDATION

CROSS REFERENCE TO RELATED APPLICATIONS

This application is a continuation of U.S. patent application Ser. No. 16/833,647, filed Mar. 29, 2020 to El Dokor et al., titled Coarse to Fine Calibration Parameter Validation and Temperature Mitigation, which in turn claims the benefit of U.S. patent application Ser. No. 16/177,360 filed Oct. 31, 2018 to El Dokor et al., titled Coarse to Fine Calibration Parameter Validation and Temperature Mitigation, now U.S. Pat. No. 10,607,370, which in turn claims the benefit of U.S. Provisional Patent Application No. 62/579,851, filed Oct. 31, 2017 to El Dokor, titled Coarse to Fine Calibration Parameter Validation and Temperature Mitigation, the entire contents of each of these applications being incorporated herein by reference.

BACKGROUND

A typical camera production line consists of various stages. Some of these stages may include:
1. PCB printout stage: where, the actual printed circuit is printed out and made ready for assembly
2. Pick and place stage: where the actual components are put in place
3. Lens assembly and focusing stage: where the lenses themselves are placed and focused on a bracket: either manually or automatically. Lenses are then glued via Ultraviolet curing or another technique for holding the lens onto the PCB.
4. Calibration stage: this is used in the case where the camera is a measurement device. It becomes important to calibrate the camera, in preparation for usage under real world conditions.
5. Release/Deployment Readiness stage: this is used as a final checklist before release of the camera itself Each of the steps defined above may include one or more stations and may include multiple individuals working on these stages. For economic purposes, the quality of a manufacturing process is constantly needing to be assessed. A typical approach to evaluate such a quality involves yield measurement. This is done at every step presented above as well as an overall assessment at the end of the manufacturing process. One very good indicator of yield assessment, and hence, yield enhancement, is the evaluation of various estimated opto-mechanical calibration parameters that are being estimated during the calibration phase. Such parameters typically include rotational parameters between two cameras in a stereo setup such as pitch yaw and roll. They may also include translation parameters, such as the distance in all three dimensions. They may also include optical parameters for the individual cameras, such the translation between the two cameras in all three dimensions. Note that the list of steps above is an abrogated list. There is, in reality, a longer list of steps that are involved in the manufacturing and assembly of camera hardware.

SUMMARY

The inventors of the present invention have recognized that in a factory setting, consistency of calibration parameters is critical across multiple calibrations of the same device and multiple calibrations of devices from the same product family (similar hardware and assembly process). Such consistency highlights robustness of the product manufacturing and assembly process and is a good indicator of what the yield outcome of the product is going to be like. There are different types of problematic issues with yield can be exposed from tracking opto-mechanical estimated parameters across calibrations.
1. Systemic problems with manufacturing and assembly: These problems are typically related to the hardware design, assembly or testing process.
2. Yield Related: associated with individual hardware components, including lenses, lens holders, electrical components, etc.
3. Software Related: connected to the calibration process itself with the various parametric estimations, or connected to the data mining steps and the need to adapt the data mining steps to new manufacturing challenges.

The utilization of parametric consistency to uncover manufacturing problems applies to almost any device where calibration is a requirement. Other example use cases involve industrial robotics, time-of-flight cameras, structured light cameras, laser range finders, etc.

While applicable to many situations, an embodiment of the present invention will utilize a stereo setup by way of example. The discussion in this application will focus on the analysis of calibration parameters and the definition of associated pass/fail criteria based on these calibration parameters' estimation as well as their consistency over multiple calibrations. One application of this process is application to system that includes stereo image sensors or cameras, and may be used for parcel or cuboid dimensioning. It may also be focused on a virtual ruler or virtual measuring tape based on a similar approach.

In accordance with an embodiment of the invention, a series of inventive techniques to evaluate calibration taking place on factory floors at multiple locations, or in other calibration situations, have been developed to address the quality control for a camera production line for highly accurate vision applications. Coarse and fine camera production Pass/Fail criteria are presented for determining the success or failure of a calibration run. Several key performance metrics and measures are presented as part of such Pass/Fail criteria. Additionally, several techniques to assess yield and monitor production efficacy on the production floor based on the accuracy of calibration parameter estimation are described. A deployment readiness (DR) protocol is presented and can be tuned to the application, helping quantify camera production yield. These techniques help assess systemic issues in camera production lines as well as various other problems that may be impacting a production line.

BRIEF DESCRIPTION OF THE DRAWINGS

The invention will be described making reference to the drawings, in which.

FIG. 11(*b*) is a line graph depicting a change in Focal Length in response to changes in temperature; and FIG. 11(*c*) is a line graph depicting a change in Tx in response to changes in temperature.

DESCRIPTION

Figure 1:
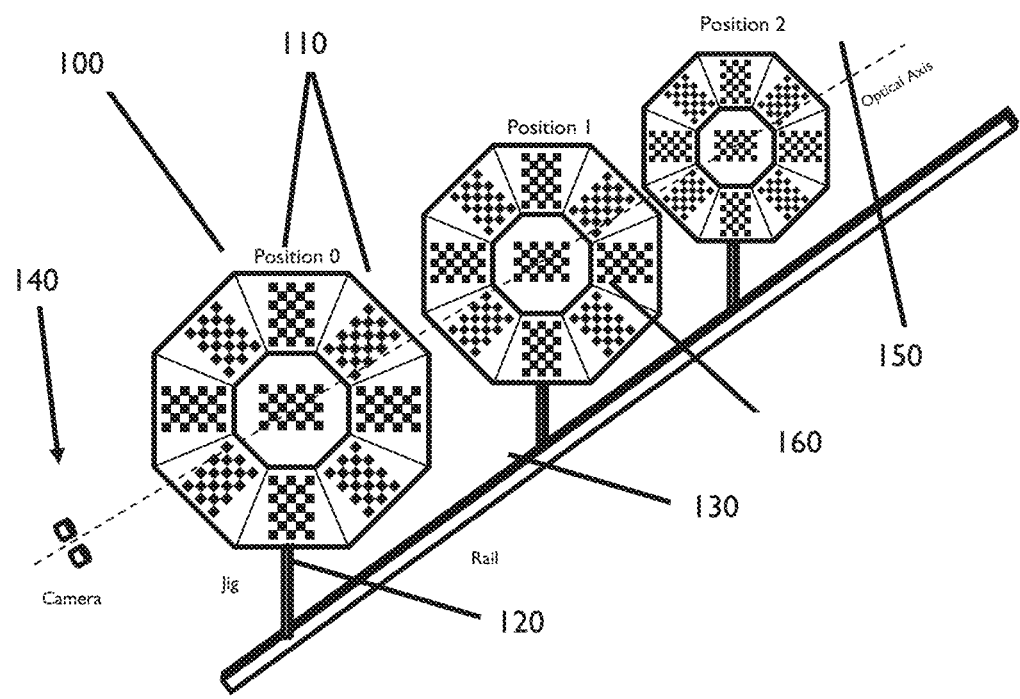
FIG. 1 is a sample calibration system constructed in accordance with an embodiment of the invention.

In accordance with various embodiments of the invention, the term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application specific integrated circuit) or any other SoC such as Qualcomm's Snapdraggon processor, or even a specialized vision SoC or vision IP component found in a bigger SoC. The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any subject matter described in this disclosure or on the scope of what may be claimed, but rather as descriptions of features that may be specific to particular embodiments of the subject matter described in this disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In accordance with an embodiment of the invention, an example calibration target is presented in FIG. 1, with a calibration element 100 shaped similar to a flower to cover the field of view symmetrically. Calibration element 100 is comprised of multiple "petals" 110, each of which has a checkerboard light calibration target. The calibration element is mounted to a movable jig 120 that is movable along a rail 130, and can position calibration element 100 at predetermined distances from a camera 140 that is being calibrated. The movable jig may be programmed to move to one or more predetermined distances according to a predefined sequence associated with the calibration, such as Position 0, Position 1, Position 2 as shown in FIG. 1, maintaining the position of calibration element 100 along the optical axis of camera 140. Jig 120 and rail 130 may further allow for calibration element 100 to pan, swivel or tilt relative to camera 140 to add more variation to the captured images. A more complete description of the form and operation of this calibration element 100 is included with U.S. patent application Ser. No. 15/997,737 the entire contents of this application being incorporated herein by reference. Checkers 160 are provided as known patterns that are to be extracted (imaged) by camera 140 at the different distances/positions of calibration element 100 from camera 140. The checkers themselves preferably have a predefined distance and size. The various target of calibration element 100 is preferably placed at the noted positions, and images of calibration element 100 at the various predetermined positions are acquired. A symmetrical object, such as calibration target 100, is preferred for calibration over other types of objects because it allows for an equal number of patters to be extracted across the field of view of the camera.

In accordance with an embodiment of the invention, calibration of a camera, for example, may be performed by a data processing apparatus with a computer program or other computer instructions included thereon. The inventors have determined that there are preferably two types of pass/fail criteria that should be defined and used to evaluate a calibration system: coarse Pass/Fail and fine Pass/Fail.

Coarse Pass/Fail Criteria—These criteria preferably encapsulate the general mechanical specifications of a camera or other sensor or element to be calibrated, as defined by the equipment manufacturer. These criteria can be derived from requirements documentation and manufacturing tolerances provided by the manufacturer. Coarse criteria capture variability in the manufacturing process that manifests itself as changes in the estimated camera parameters. The estimated camera parameters are preferably extracted from a set of predefined geometrical and projection equations and estimated based on the extracted patterns themselves from the calibration element as described by El Dokor et al, Zhang, Kannalla et al, and Heikkilä. As described by Tsai, Rudakovaet al, Kang et al, Bradley et al, and Greiger et al, this is done by taking one or more simultaneous image captures from different camera viewpoints at various locations and extracting known patterns, or even algorithm extracted landmarked points and using these to bag project locations from one image to another via predefined geometrical and/or projection equations. Passing coarse criteria does not necessarily ensure that the calibration is accurate, but it serves as an initial screening to make sure that there are no serious flaws in the camera manufacturing process. Further examples of calibration patterns and extracted features are given in El Dokor et al, Mallon et al, and Cui et al.

Figure 2:
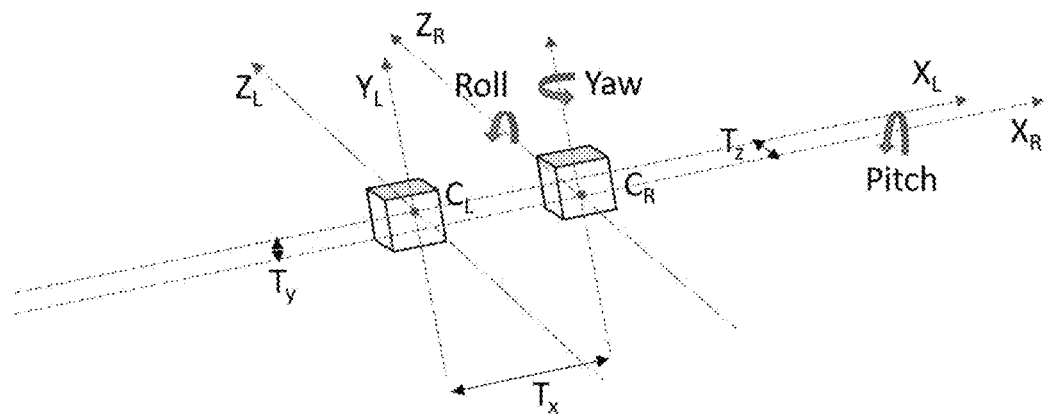
FIG. 2 is an illustration of critical camera parameters in accordance with an embodiment of the invention.

FIG. 2 depicts an illustration of a number of critical camera parameters associated with the positioning and operation, and therefore calibration, of a stereo camera, in accordance with an embodiment of the invention, including for example, translation in the x (Tx), y (TY), or z (Tz) directions, variation in pitch, roll, yaw, variation in the horizontal ($X_L$) or vertical ($Y_L$) optical axis, and variation in the focal length ($f_L$) and aspect ratio ($a_L$). Variations in the manufacturing process, or the presence of a defective design may introduce instability in the estimated parameters, relative to the theoretical or ground-truth ones.

Table 1 shows a sample list of values for these parameters and associated tolerances derived from one set of exemplary camera manufacturing specifications. Such specifications are typically provided by original design manufacturers or joint design manufacturers, and are agreed to by the original equipment manufacturers.

TABLE I

Sample coarse criteria based on critical camera parameters and tolerances

| Parameter | Specification | Minimum | Maximum |
| --- | --- | --- | --- |
| Focal Length | 4.5 ± 0.2 mm | 4.3 mm | 4.7 mm |
| Aspect Ratio | 1.0 ± 0.072 | 0.928 | 1.078 |
| Horizontal Optical Center | 2.3 ± 0.275 mm | 2.025 mm | 2.575 mm |
| Vertical Optical Center | 1.4 ± 0.275 mm | 1.125 mm | 1.675 mm |
| X Translation | 60 ± 0.55 mm | 59.45 mm | 60.55 mm |
| Y Translation | 0 ± 0.55 mm | −0.55 mm | 0.55 mm |
| Z Translation | 0 ± 0.55 mm | −0.55 mm | 0.55 mm |
| Pitch | 0 ± 1.5 deg | −1.5 deg | 1.5 deg |
| Yaw | 0 ± 1.5 deg | −1.5 deg | 1.5 deg |
| Roll | 0 ± 1.5 deg | −1.5 deg | 1.5 deg |

Fine Pass/Fail Criteria—These criteria are fine-tuned criteria preferably encapsulate secondary key performance indicators and metrics (KPI/KPMs) that detect units differing significantly in behavior from the expected production population. While the changes may not be apparent at first, since they will pass coarse criteria specifications, they can be identified via a series of statistical analysis steps. The KPI/KPMs may include lower and higher order statistics. Lower order statistics may preferably include the mean and standard deviation of the various measured values, such as those shown in Table 1, as examples. Higher order statistics may preferably include measures such as the kurtosis and skew of the critical camera parameters obtained over a sample of camera calibrations. These sample statistics are preferably then used to detect outliers in the manufacturing process, by comparing them to population statistics. Such outliers may once again highlight flaws and defects in the manufacturing process. To get the fine pass criteria, the same camera may typically be calibrated multiple times. This is done to best fit the camera parameters to ground truth measures associated with it. For instance, a box of known measurements may be used as the ground truth. It may also undergo stress testing, at the end of which an analysis of the camera's calibration may be done.

Another reason why multiple calibrations are used is to address the variability in the lens quality in real life scenarios. This potentially includes lens distortions, lens focus, etc. A typical measure of the sharpness metric for a given lens/camera combination is line pairs/mm or 1 p/mm. This measure defines the number of line pairs that can be resolved for a given image when the image is focused at different locations. However, the 1 p/mm varies across the image depending on lens distortions. Camera parameters may not only be extracted from multiple calibrations, but may also be localized to different parts of the images at different depths. This is preferably performed to further improve measurement accuracy that is associated with a calibrated system of cameras. The process is above is preferably used for calculating different calibration parameters based on lens distortions, measured through metrics such as line pairs per mm, so that depending on what part of the field of view an object is measured, a modified set of calibration parameters may be used for measurement.

Figure 3:
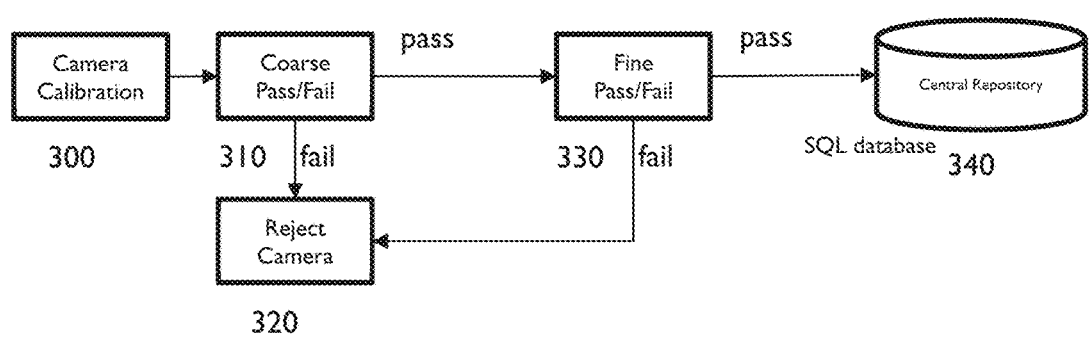
FIG. 3 is a flowchart diagram depicting a process for updating a central repository in accordance with an embodiment of the invention.

To enable efficient analysis of, both, the coarse and fine pass/fail criteria and to keep track of camera population statistics, a central repository constructed in accordance with the present application will preferably store the parameters for every calibration run on the camera manufacturing factory floor. The central repository can be implemented in the form of a SQL, with an example of such an architecture depicted in FIG. 3. As is therefore shown in FIG. 3, a camera is first calibrated in a camera calibration step 300. Processing then continues at step 310 where a coarse check of the estimated camera parameters is preferably performed. If these parameters fail the coarse check at step 310, then the camera is rejected at step 320. If on the other hand, the estimated parameters pass the coarse check at step 310, then processing passes to step 330, where the parameters are then analyzed in accordance with the fine pass/fail criteria. Should the parameters pass at step 330, the successful parameters are then preferably stored within the central repository at step 340. Any failed cameras at step 330 would similarly be rejected at step 320, and would preferably be taken off the line for further analysis. The central repository, an example of the structure of which is shown in FIG. 3 at 350, in addition to maintaining the calibration parameters of the successfully-calibrated cameras, also maintains KPI/KPMs for the current entries which are used as population KPI/KPMs. Therefore, after every calibration, a check of the estimated parameters is performed to ensure that the currently-measured parameters are within manufacturing tolerances.

Figure 4:
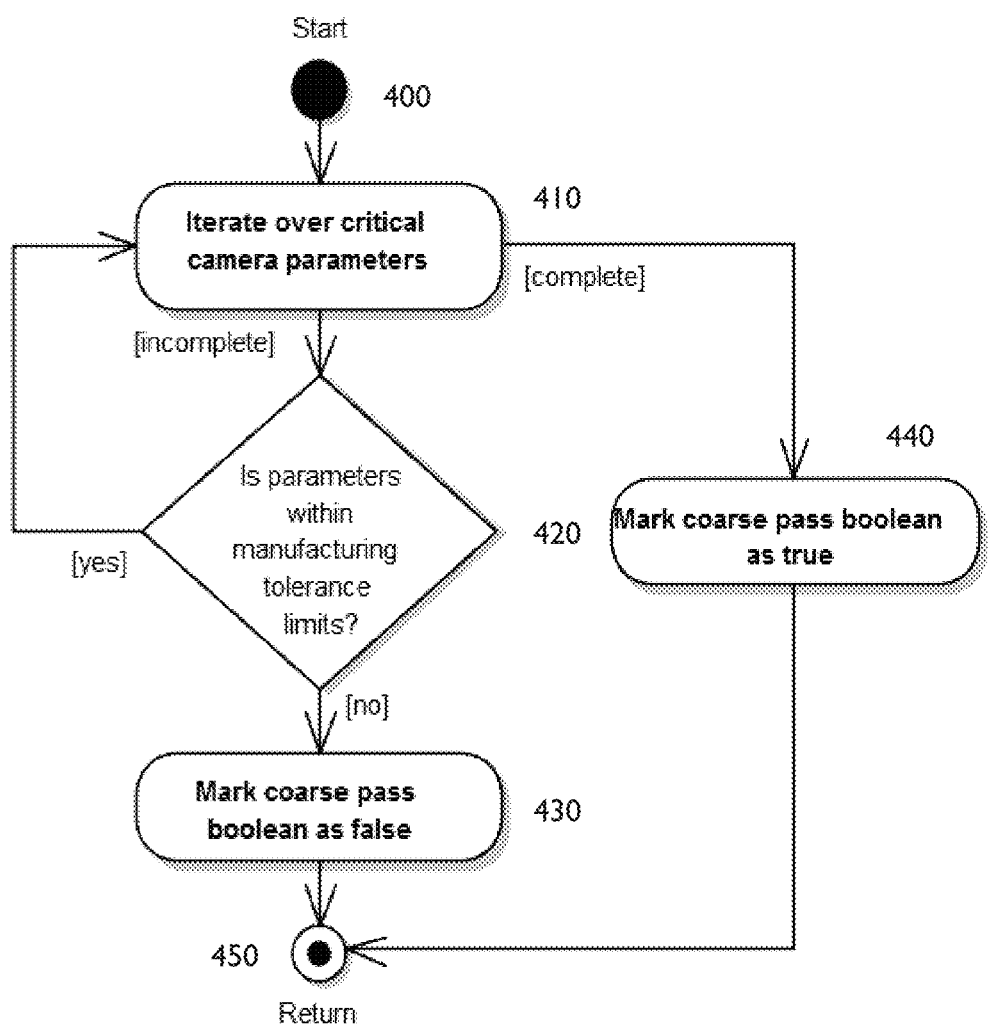
FIG. 4 is a flowchart diagram depicting a course criteria check in accordance with an embodiment of the invention.

As is shown in FIG. 4, processing for determination of coarse criteria pass/fail begins at start 400. Processing moves to step 410 where critical camera parameters are iterated, where repeated calibration runs may be performed to check that the calibration estimation is stable and returns parameters that are within predefined limits. If it is determined at step 410 that the iteration process is incomplete, processing passes to step 420 where it is queried whether a measured parameter is within manufacturing tolerance. If this inquiry is answered in the affirmative, and it is determined that the measured parameter is within manufacturing tolerance, processing returns to step 410. If on the other hand, the inquiry at step 420 is answered in the negative, and it is determined that the measured parameter is not within manufacturing tolerance, processing instead passes to step 430, where the passing of the coarse parameter test is marked as false, and processing is completed at step 450. Referring back to step 410, if the iteration is determined complete, then processing passes to step 440, and the coarse parameter test is market as true, and processing is completed at step 450.

Figure 5:
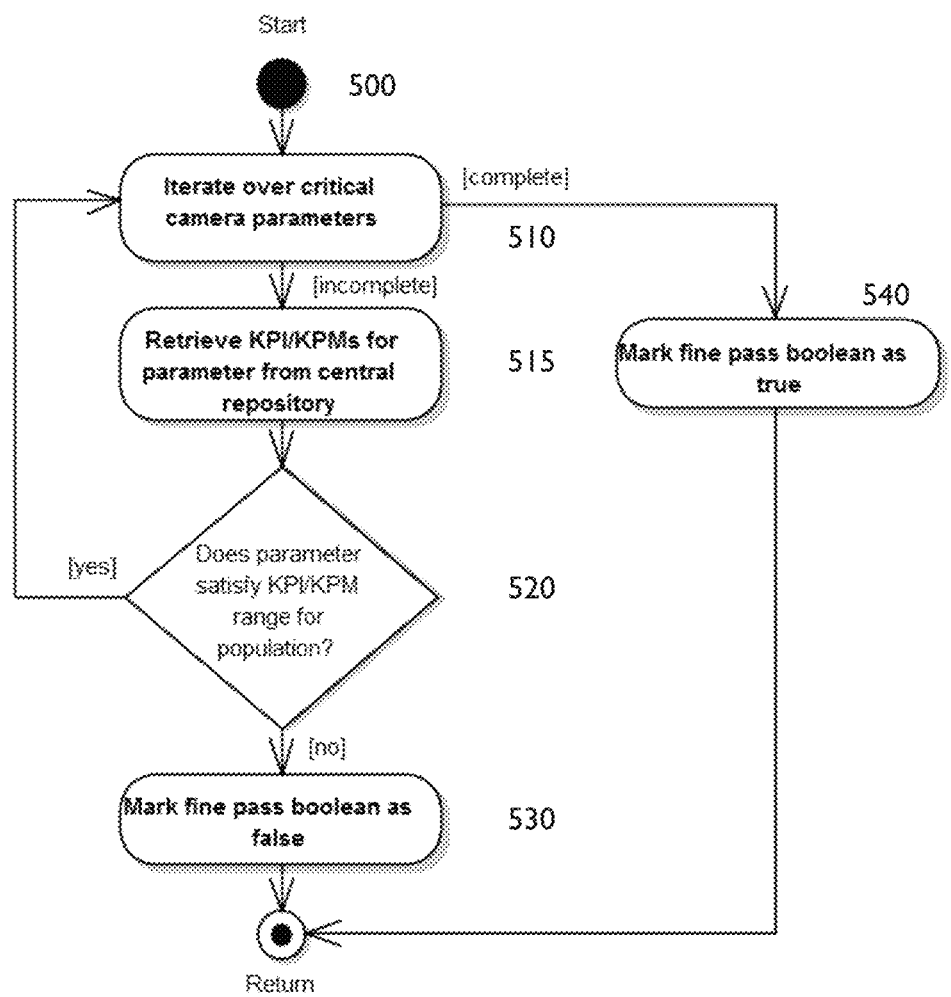
FIG. 5 is a flowchart diagram depicting a fine criteria check in accordance with an embodiment of the invention.

Referring next to FIG. 5, a process for measuring a pass/fail criteria for the fine criteria is depicted. Processing for determination of fine criteria pass/fail begins at start 500. Processing moves to step 510 where critical camera parameters are iterated, where repeated calibration runs may be performed to check that the calibration estimation is stable and returns parameters that are within predefined limits. If it is determined at step 510 that the iteration process is incomplete, processing passes to step 515 where one or more KPIs/KPMs for a parameter to be measured are retrieved from a central repository, such as that shown in FIG. 6 (described below.) Processing then continues at step 520 where it is queried whether the measured parameter satisfies the KPI/KPM range for the population of measured parameters. If this inquiry is answered in the affirmative, and it is determined that the measured parameter satisfies the KPI/KPM range for the population of measured parameters, processing returns to step 510. If on the other hand, the inquiry at step 420 is answered in the negative, and it is determined that the measured parameter does not satisfy the KPI/KPM range for the population of measured parameters, processing instead passes to step 530, where the passing of the fine parameter test is marked as false, and processing is completed at step 550. Referring back to step 510, if the iteration is determined complete, then processing passes to step 540, and the fine parameter test is market as true, and processing is completed at step 550.

As noted, the fine pass/fail criteria may be based on KPI/KPMs so that much more complex techniques are preferably used. The lower and higher order statistics are preferably used to detect anomalous cases by comparing the statistics of a sample to those of the population. Such cases preferably exhibit significantly different lower and higher order statistics compared to the rest of the population. The statistical significance of the differences are preferably verified by using techniques like ANOVA and hypothesis testing. According next to FIG. 6, a system is shown so that after a set of calibrations, a central repository is preferably queried to obtain the current population statistics and several KPI/KPMs are checked The procedure for determining the secondary key performance indicators for fine pass/fail criteria involves the following steps:
1. Data Collection
2. Iterating Calibration
3. Deployment Readiness (DR).

Figure 6:
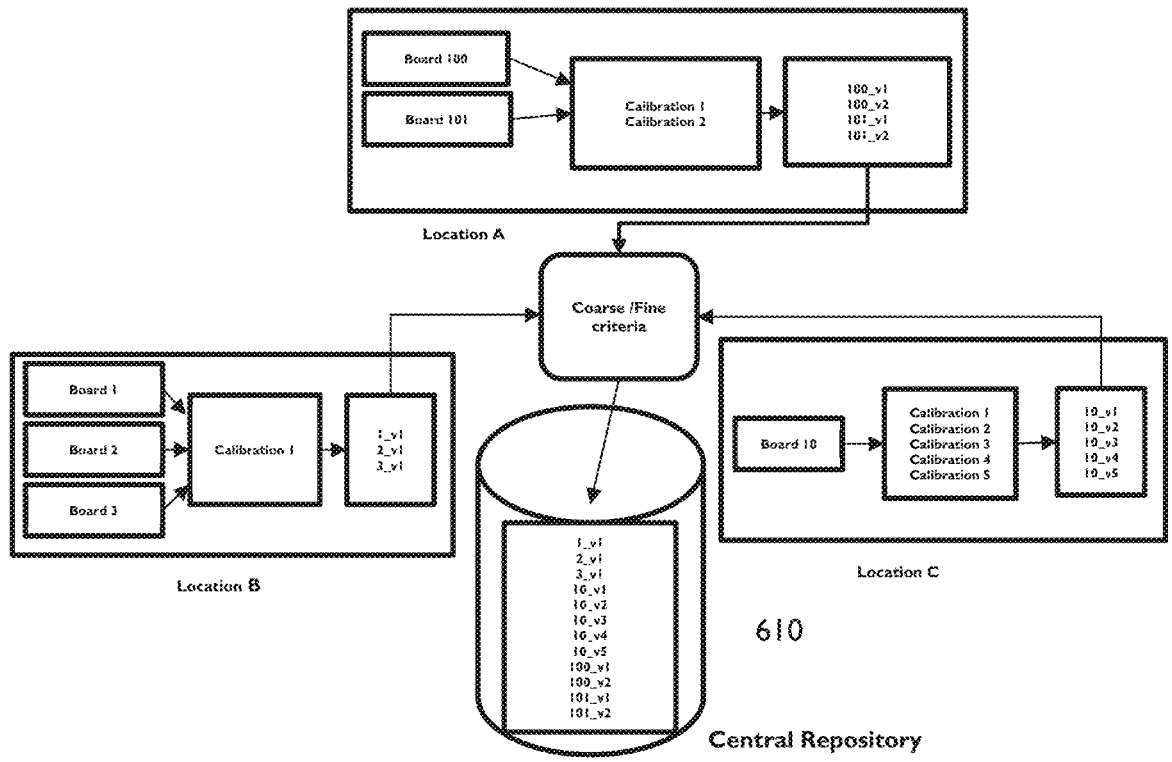
FIG. 6 is a flowchart block diagram depicting data collection in accordance with an embodiment of the invention.

Data Collection: As is shown in FIG. 6, in the data collection phase, several calibration attempts at different locations (Locations A, B, C in FIG. 6) with the same camera and different calibrations are preferably performed. Estimated calibration parameters are then analyzed for coarse and fine criteria using identical calibration systems as noted above with respect to FIGS. 4 and 5. Calibrations that pass the coarse/fine criteria are preferably saved into a central repository 610 and will in the future therefore contribute towards overall population statistics. FIG. 6 shows an example block diagram of the process.

Figure 7:
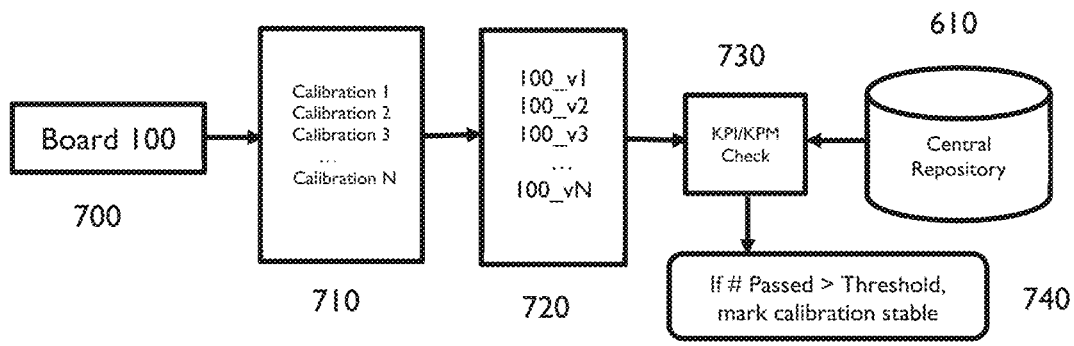
FIG. 7 is a flowchart diagram for iterating calibration for checking stability of a calibrated system in accordance with an embodiment of the invention.

Iterating Calibration: As is shown next in FIG. 7, in the iterating calibration phase, repeated calibration runs are preferably performed to check that the calibration estimation is stable and returns parameters that are within predefined limits. Fine criteria that use KPI/KPMs will also be utilized for this purpose. As is shown in FIG. 7, each board 700 is preferably put through N calibrations at step 710, generating N calibration files at step 720. The above noted KPI/KMI check (FIG. 5) is performed at step 730, using populations parameters for the tests from central repository 610. Finally, at step 740, if the number of KP/KMI checks s greater than a predetermined threshold, the calibrations is preferably marked stable.

Figure 8:
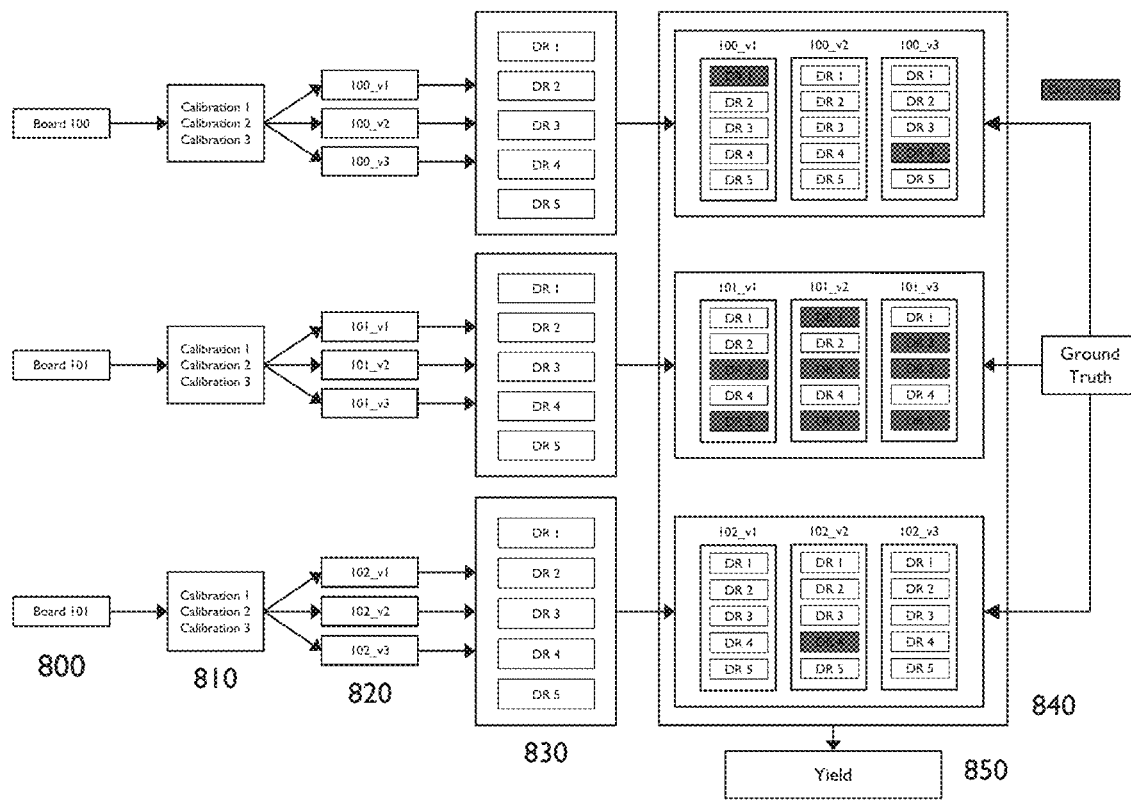
FIG. 8 is a block diagram depicting a procedure for measuring yield in accordance with an embodiment of the invention.

Deployment Readiness (DR): Referring next to FIG. 8, validation of deployment readiness will be described. As is shown in FIG. 8, for the deployment readiness phase, the estimated calibration parameters will be tested in the context of the application by running the application repeatedly using cameras (board 800) that have been just calibrated, and checking performance for each run (calibration process 810 generating calibration file 820). The calibration process is then re-run multiple times for different cameras to generate ground truth files 830. The aforementioned test is re-run each time and the results are recorded and analyzed with statistical testing performed to quantify consistency at step 840, and a resulting yield depicted at step 850. As an example, if the application is related to cuboid-dimensioning, deployment readiness may involve repeatedly dimensioning a cuboid for using the recently calibrated system and computing the error as the differences between the dimensions obtained and the ground-truth dimensions. The calibration itself may then be repeated and for each calibration the dimensioning and error computation may be repeated. Error within a pre-determined specification (e.g. one-inch for the cuboid dimensioning case) will be considered a pass. The overall results are then used to determine the yield 850.

In accordance with a preferred embodiment of the invention, it is anticipated that key performance indicators or metrics based on the KPI/KPMs based on lower and higher order statistics of the collected parameters may be determined so that pass/fail criteria parameters may be established and met. Realizing that this is a lengthy and time-consuming process, the goal of one aspect of the present invention is to reduce the required number of calibration and testing iterations as the number of calibrated units is increased and the yield is established. Once a manufacturing process has matured, most of the analysis is preferably focused on a smaller set of critical parameters only, as determined in accordance with this analysis.

Other countermeasures will also take place at the Calibration Fixture. The goal of such countermeasures is to address issues including, but not limited to:
1. Address issues of image noise
2. Address issues with calibration accuracy
3. Address thermal issues that may be affecting the camera
4. Speed up the process of calibration A signal to noise ratio analysis may be conducted to detect significant degradation of image quality and a minimum SNR spec is preferably established to reject calibration runs that fail the SNR spec. A typical method of estimating SNR is to take multiple captures of a typical scene (such as a cuboid for the cuboid dimensioning application) and compute the mean and standard deviation of pixel values over time for all pixels within a region-of-interest (ROI). If $F_i$, i=0, 1, 2, . . . , T represents the frame captured, and x, y represent the x, y co-ordinates of the top left location of the rectangular ROI with width w and height h in pixels, the mean and standard deviation of pixel values within the ROI over time is given as $$\mu_{ROI} = \frac{1}{whT}\sum_{i=x}^{i<x+w}\sum_{j=y}^{j<y+h}\sum_{t=0}^{t<T}F_t(i,j)^2 \qquad \text{Equation 1}$$

$$\sigma_{ROI} = \frac{1}{wh}\sum_{i=x}^{x+w}\sum_{j=y}^{y+h}\sqrt{\frac{1}{T-1}\sum_{t=0}^{T}\left(F_t(i,j) - \frac{1}{T}\sum_{t=0}^{T}F_t(i,j)\right)}$$

The SNR is then estimated as $$SNR = 20\log_{10}\frac{\mu_{ROI}}{\sigma_{ROI}} \qquad \text{Equation 2}$$

Figure 9:
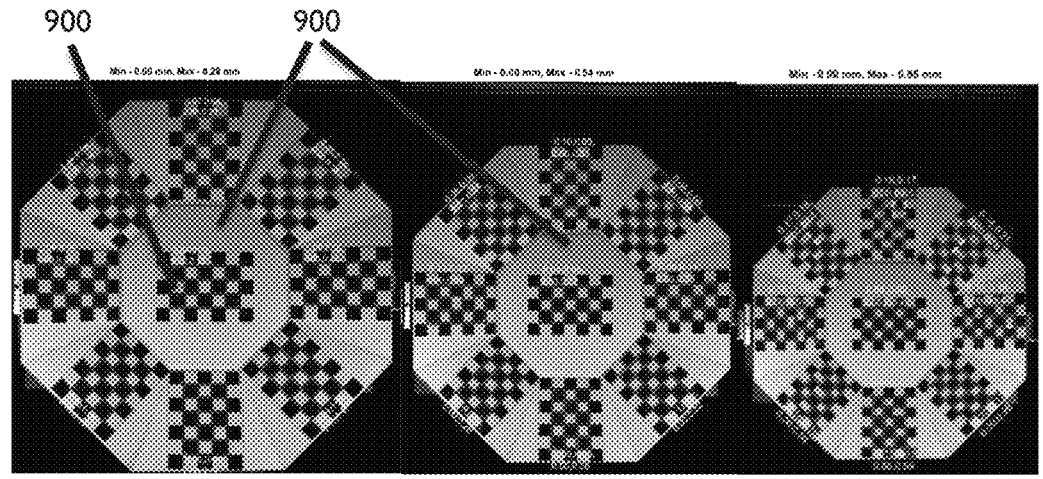
FIG. 9 is a plan view depicting measurement errors within a calibration target at increasing distances from a camera being calibrated in accordance with an embodiment of the invention.

Measures can be put in place to check how accurate a calibration is by using the estimated calibration parameters to measure 3D distances across a checkerboard pattern positioned on a calibration target, such as that shown in FIG. 9, and compute the average measurement error between the estimated and actual 3D distances. A maximum error specification can be put in place to reject calibration runs that fail this spec. FIG. 9 shows a calibration target 900 with 20 mm squares 910 at increasing distances from the camera. Superimposed on the targets are lines that mark the unique edges each of the patterns comprising the target. The lines are pseudo-colored with the measurement error with blue representing low error and red representing high error. The goal would be to statistically determine the error that is associated with the checkers themselves and to minimize the errors for various cameras as the calibration process matures.

Figure 10:
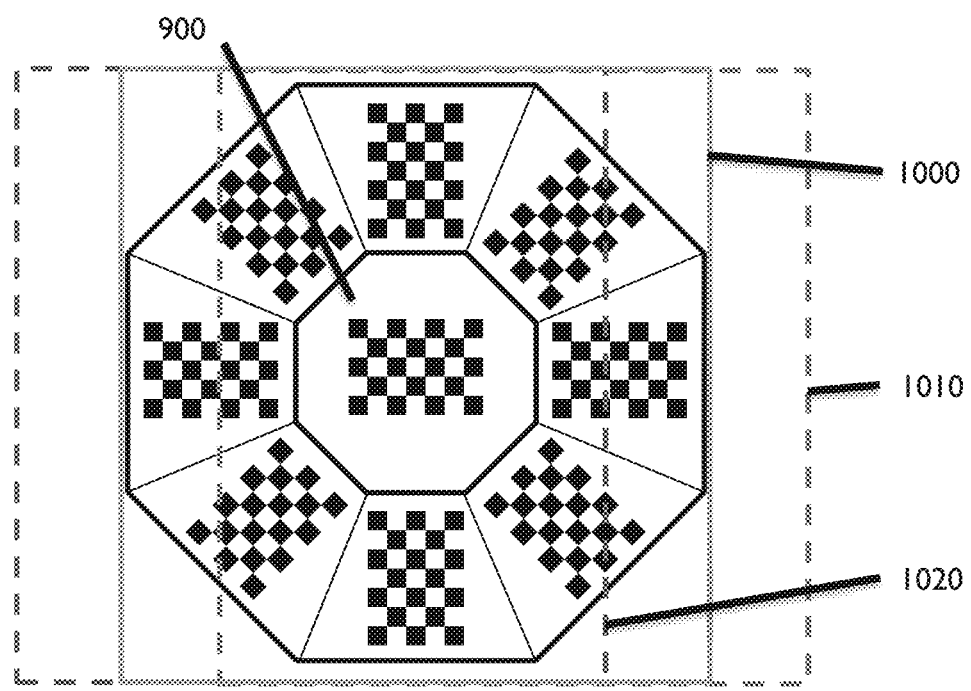
FIG. 10 is a plan view depicting an effect of field of view overlap in accordance with an embodiment of the invention.

Measures can also be put in place to ensure that the appropriate field of view has been established for calibration by putting a limit on the minimum number of visible matched patterns. FIG. 10 illustrates how a partial field of view (dotted squares 1010 and 1020) reduces the number of complete calibration targets/patterns detected. Any calibration run that doesn't give a minimum number of matched patterns may be rejected. Partial calibration targets may also be matched to increase the number of extracted patterns. Finally, other measures can also be put in place to ensure that repeated calibration runs, without removing and replacing cameras or target positions result in a minimal shift in the estimated 2D locations of calibration features. FIG. 10 shown an effect of field of view (FOV) overlap between left and right cameras on number of complete and partial patterns being detected. Box 1000 shows a correct centered camera position, resulting in an imaged number of complete patterns=9. All the other partial patterns are preferably also extracted; Blue dotted box 1010 shows where the camera is shifted to right and the imaged number of complete patterns=6 other partial patterns will also be extracted and matched; Red dotted box 1020 shows where the camera is shifted to left and the imaged number of complete patterns=6. The rest of the matched patterns will be an incomplete set of partial patterns, which are still matched between left and right views. Partial matches will then be matched with corresponding matches, even if the associated pattern in the other field of view is complete. The only visible potential matches in both fields of view will be matched.

Temperature readings from the camera may be used to determine if a camera is operating outside the ideal temperature range. Calibration runs that are conducted when the camera is too hot or too cold may be rejected. Parameters can be estimated when the camera is at different temperatures and a model of parameter variation with temperature can be estimated which can then be used to correct parameters based on operating temperatures at the Calibration station. For example, different calibrations may be extrapolated or estimated at different temperature ranges. These can then be matched in the filed in real time, especially if they are "pre-baked" into the system as part of the calibration process. Hence the process can calculate different calibration parameters for different temperatures. Coupled with external and internal temperature information, the system can modify the calibration parameters based on prior knowledge and measure with a temperature specific set of calibration parameters.

Figure 11A:
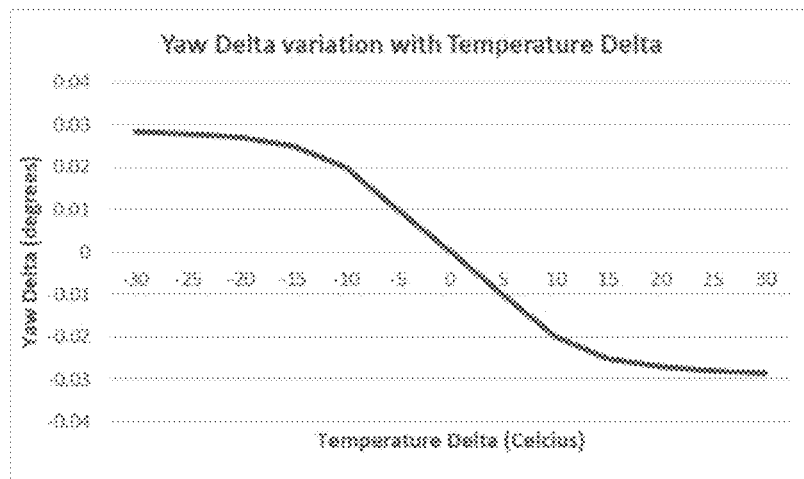
FIG. 11(*a*), is a line graph depicting a change in Yaw in response to changes in temperature.
Figure 11B:
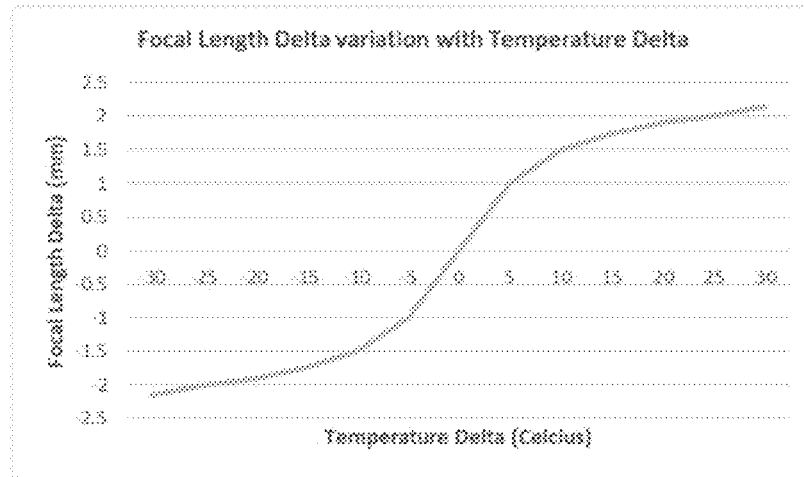
Figure 11C:
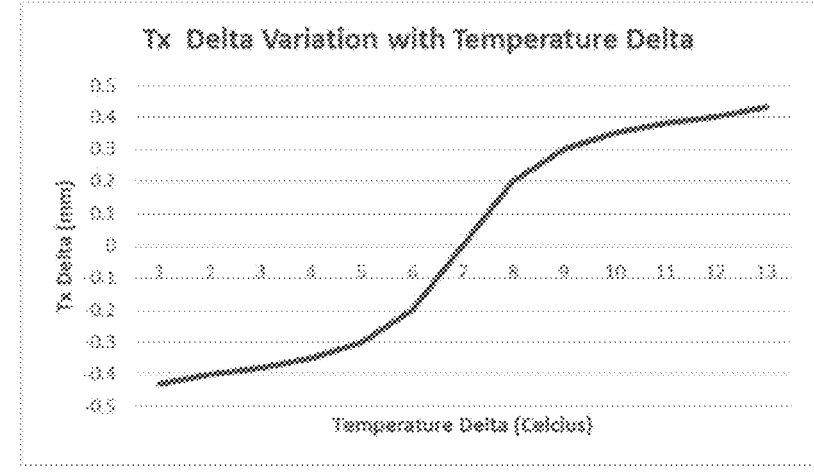

FIG. 11 shows simulated variations in the parameters due to temperature changes. These pre-baked values will account for variations in optomechanical parameters across temperatures and help the calibration and the subsequent performance be more robust over time and over temperature. Changes in parameter deltas across temperature changes are shown, and in particular, in FIG. 11(*a*) variations in yaw over temperature, FIG. 11(*b*) variations in the Effective Focal Length over temperature, and FIG. 11(*c*) variations in the distance between the two cameras' optical axes over temperature.

The calibration process may be accelerated by using parallelization techniques that use multi-threading on specialized GPU hardware for extracting calibration features and common processes like 2D to 3D triangulation and 3D to 2D reprojection.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

The aforementioned disclosure may be applied to a multi-camera system as well as other applications such as single or multi camera systems with structured light sources. The same concepts of calibration under different temperature variations as well as calibration for different lens distortions can be directly applied during their calibration processes, regardless of what calibration approach is fundamentally used to get camera parameters and measure distance/size.

What is claimed:

1. A method for calibration parameter validation of a camera, comprising:
    performing a camera calibration generating a calibration result measuring one or more Key Performance Indicators (KPIs) including one or more from the group of mean, standard deviation, kurtosis and skew of critical camera parameters;
    applying a fine pass-fail criteria based upon at least information stored at a central repository related to the KPIs including one or more from the group of mean, standard deviation, kurtosis and skew of critical camera parameters collected over a sample of camera calibrations to the calibration result in order to identify significant deviation of one or more KPIs from those of an expected production population;
    rejecting the camera if the calibration result does not pass the fine pass fail-criteria;
    accepting the camera if the calibration result passes the fine pass fail-criteria; and
    entering the calibration result and associated KPI measurements into the central repository for use in further applications of the fine pass-fail criteria applicable to all future cameras.

2. The method of claim 1, wherein the KPI information is determined based upon a statistical analysis on calibration results for a population of cameras being calibrated.

3. The method of claim 1, wherein applying the fine pass-fail criteria to the calibration result comprises:
    iterating one or more critical calibration parameters over a plurality of calibration measurements;
    retrieving one or more KPIs for one or more measured parameters of the calibration result from the central repository;
    determining whether the one or more critical calibration parameters satisfy the KPI metric range for the camera population in order to identify significant deviation of one or more parameters from those of the expected production population;
    marking the fine pass-fail criteria as failed if the KPIs do not satisfy the range for the camera population; and
    marking the fine pass-fail criteria as passed if the KPIs satisfies the range for the camera population.

4. The method of claim 3, wherein the one or more KPI is adjusted for changes in temperature.

5. The method of claim 4, wherein a parameter of yaw of the camera is the KPI adjusted for changes in temperature.

6. The method of claim 4, wherein a parameter of focal length of the camera is the KPI adjusted for changes in temperature.

7. The method of claim 4, wherein a parameter of translation of the camera along the x axis is the KPI adjusted for changes in temperature.

8. A system for calibration parameter validation of a camera, comprising:

a calibration target for assisting in calibrating a camera to be calibrated, the calibration target preferably able to be positioned at predetermined distances from the camera to be calibrated, and the camera to be calibrated imaging the calibration target one or more times to generate one or more calibration results measuring one or more Key Performance Indicators (KPIs) including one or more from the group of mean, standard deviation, kurtosis and skew of critical camera parameters;

a processor for receiving the calibration result, applying a fine pass-fail criteria based upon at least information stored at a central repository related to the KPIs including one or more from the group of mean, standard deviation, kurtosis and skew of critical camera parameters collected over a sample of camera calibrations to the calibration result in order to identify significant deviation of one or more KPIs from those of an expected production population, rejecting the camera if the calibration result does not pass the fine pass fail-criteria, accepting the camera if the calibration result passes the fine pass fail-criteria, and entering the calibration result and associated KPI measurements into the central repository for use in further applications of the fine pass-fail criteria applicable to all future cameras.

9. The system of claim 8, wherein the KPI information is determined based upon a statistical analysis on calibration results for a population of cameras being calibrated.

10. The system of claim 8, wherein applying the fine pass-fail criteria to the calibration result by the processor comprises:
- iterating one or more KPIs over a plurality of calibration measurements;
- retrieving one or more KPI information for one or more measured parameters of the calibration result from the central repository;
- determining whether the one or more critical calibration parameters satisfy the KPI metric range for the camera population;
- marking the fine pass-fail criteria as failed if the KPI metrics do not satisfy the range for the camera population; and
- marking the fine pass-fail criteria as passed if the key performance indicator/key performance KPI metrics satisfies the range for the camera population.

11. The system of claim 10, wherein the one or more KPI is adjusted for changes in temperature.

12. The system of claim 10, wherein a parameter of yaw of the camera is the KPI adjusted for changes in temperature.

13. The system of claim 10, wherein a parameter of focal length of the camera is the KPI adjusted for changes in temperature.

14. The system of claim 10, wherein a parameter of translation of the camera along the x axis is the KPI adjusted for changes in temperature.

* * * * *